United States Patent [19]

Takata

[11] Patent Number: 4,892,362
[45] Date of Patent: Jan. 9, 1990

[54] ANTILOCKING APPARATUS FOR VEHICLE BRAKES

[75] Inventor: Koji Takata, Hyogo, Japan

[73] Assignee: Sumitomo Electric Industries, Ltd., Osaka, Japan

[21] Appl. No.: 230,617

[22] Filed: Aug. 9, 1988

[30] Foreign Application Priority Data

Aug. 13, 1987 [JP] Japan ................ 62-202114

[51] Int. Cl.⁴ .................... 303 68; 303 84.2; 303 113; 303 114; 303 115; 303 116; 303 117; 303 119; 188 131 A
[52] U.S. Cl. .................... 303/115; 303/117; B60T/8/42; B60T/13/70
[58] Field of Search ............... 303/68, 84.2, 113, 114, 303/115, 116, 117, 119; 188/181 A

[56] References Cited

U.S. PATENT DOCUMENTS

| | | |
|---|---|---|
| 3,549,212 | 12/1970 | Leiber . |
| 3,746,402 | 7/1973 | Hickner et al. ............ 303/115 |
| 3,858,946 | 1/1975 | Grosseau ............ 303/68 X |
| 3,973,806 | 8/1976 | Inada et al. ............ 303/113 |
| 3,975,061 | 8/1976 | Kondo et al. ............ 303/119 |
| 4,453,782 | 6/1984 | Arikawa et al. . |
| 4,708,407 | 11/1987 | Machara ............ 303/116 |
| 4,715,666 | 12/1987 | Farr ............ 303/117 X |

FOREIGN PATENT DOCUMENTS

| | | |
|---|---|---|
| 3542689 | 12/1985 | Fed. Rep. of Germany . |
| 62-34361 | 6/1987 | Japan . |
| 0078856 | 4/1988 | Japan ............ 303/117 |
| 0078861 | 4/1988 | Japan ............ 303/116 |
| 2195724 | 4/1988 | United Kingdom ............ 303/116 |

Primary Examiner—Andres Kashnikow
Assistant Examiner—Timothy Newholm
Attorney, Agent, or Firm—W. G. Fasse; D. H. Kane, Jr.

[57] ABSTRACT

An antilocking device for a vehicle has a master cylinder (2), an inlet valve (40), an outlet valve (5), a damping reservoir (6), and a pump (7). The pump (7) draws working fluid stored in the damping reservoir (6), to deliver the working fluid into a fluid path portion connecting the inlet valve (40) with a wheel brake (3). The inlet valve (40) has a differential pressure responsive valve structure actuated by differential pressure between fluid pressure in the fluid path portion connecting the inlet valve (40) with the wheel brake (3) and the fluid pressure in a fluid path portion connecting the inlet valve (40) with the outlet valve (5).

3 Claims, 4 Drawing Sheets

ANTILOCKING APPARATUS FOR VEHICLE BRAKES

FIELD OF THE INVENTION

The present invention relates to an antilocking apparatus for performing an antilocking operation for a wheel brake of a vehicle.

BACKGROUND INFORMATION

The simplest antilocking apparatus of this type is the so-called circulating type antilocking apparatus as described in U.S. Pat. No. 3,549,212.

Present FIG. 7 shows a hydraulic circuit diagram of a well-known circulating type antilocking apparatus. An inlet valve 4 is provided in a fluid path between a master cylinder 2, and a wheel brake 3. The master cylinder converts operating physical force applied to a brake pedal 1 into fluid pressure. An outlet valve 5 can discharge working fluid from a fluid path portion connecting the inlet valve 4 with the wheel brake 3. The working fluid discharged through the outlet valve 5 is temporarily stored in a damping reservoir 6. A pump 7 draws the working fluid thus stored in the damping reservoir 6, to deliver the same into a fluid path portion connecting the master cylinder 2 with the inlet valve 4. A check valve 8 allows only a unidirectional flow of the fluid.

In this well-known antilocking apparatus, the working fluid temporarily stored in the damping reservoir 6 and drawn by the pump 7 is forced toward the master cylinder 2. thus, the brake pedal 1 is pushed back against the driver's pedal force. This is the so-called kick-back against the brake pedal 1, which causes an undesirable pedal feeling.

Some proposals have been made in order to solve the aforementioned problem. One of such proposals is disclosed in U.S. Pat. No. 4,453,782 disclosing an antilocking apparatus. FIG. 8 is a hydraulic circuit diagram showing that apparatus.

In the antilocking apparatus shown in FIG. 8, a differential pressure responsive valve 9 and a high-pressure accumulator 10 are added to the structure of FIG. 7. The differential pressure responsive valve 9 is provided between a master cylinder 2 and an inlet valve 4. Working fluid discharged from a pump 7 is introduced into a fluid path portion provided between the differential pressure conscious valve 9 and the inlet valve 4. Thus, the working fluid discharged from the pump 7 can be prevented from flowing back to the master cylinder 2, by the interposition of the differential pressure responsive valve 9. The working fluid thus discharged from the pump 7 and prevented to flow back to the master cylinder 2 is stored in a high-pressure accumulator 10.

The problem of kick-back against the brake pedal is thus solved by the antilocking apparatus shown in FIG. 8. However, this apparatus is disadvantageous in weight, space and cost due to the high-pressure accumulator 10, which requires a back-up spring which is extremely larger in size than that of the low pressure damping reservoir 6, although the working fluid storage volume of the former is identical to that of the latter.

SUMMARY OF THE INVENTION

Accordingly, it is an object of the present invention to provide an antilocking apparatus which can solve the problem of kick-back against a brake pedal without employing a high-pressure accumulator. In particular, the present invention is directed to an antilocking apparatus having a high operational reliability, and which is advantageous in cost.

An antilocking apparatus for performing antilocking operation for a wheel brake of a vehicle, comprises according to the invention a master cylinder, an inlet valve provided in a fluid path connecting the master cylinder with the wheel brake to allow or cut off communication between the master cylinder and the wheel brake through the fluid path, an electrically switch-controlled outlet valve which can discharge working fluid from a fluid path portion connecting the inlet valve with the wheel brake, a damping reservoir for temporarily storing the working fluid discharged through the outlet valve, and a pump for drawing the working fluid stored in the damping reservoir, to deliver the working fluid into the fluid path portion connecting the inlet valve with the wheel brake. The inlet valve comprises a differential pressure responsive valve which is actuated by differential pressure between the fluid pressure in the fluid path portion connecting the inlet valve with the wheel brake and the fluid pressure in a fluid path portion connecting the inlet valve with the outlet valve.

In the conventional reflux type antilocking apparatus, the fluid discharged from the pump is introduced into the fluid path portion connecting the master cylinder with the inlet valve. In the present invention, on the other hand, the working fluid discharged from the pump is introduced into the fluid path portion connecting the inlet valve with the wheel brake. This feature is not at all similar to the conventional apparatus.

Since the inlet valve is provided between the master cylinder and a port for introducing the working fluid discharged from the pump into the fluid path portion communicating with the wheel brake, the working fluid is prevented from flowing back to the master cylinder. Thus, according to the present invention, kick-back against the brake pedal is prevented without using a large-sized, heavy-weight and high-priced high-pressure accumulator.

Further, the inlet valve used in the present invention includes a differential pressure responsive valve which is actuated by differential pressure between the fluid pressure in the fluid path portion connecting the inlet valve with the wheel brake and the fluid pressure in the fluid path portion connecting the inlet valve with the outlet valve. Therefore, no electronic circuit is required for the inlet valve, to provide a highly reliable antilocking apparatus which is advantageous in cost.

These and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

As hereinabove described, an antilocking apparatus according to the present invention is different from the conventional apparatus in that working fluid discharged from a pump is introduced into a fluid path portion connecting an inlet valve with a wheel brake. Therefore, specific modifications must be applied to the configuration of the inlet valve, control modes, setting or a pump discharge ability and the like as compared with the conventional apparatus. Further, the inlet valve is different in function from that of the conventional apparatus.

Figure 1:
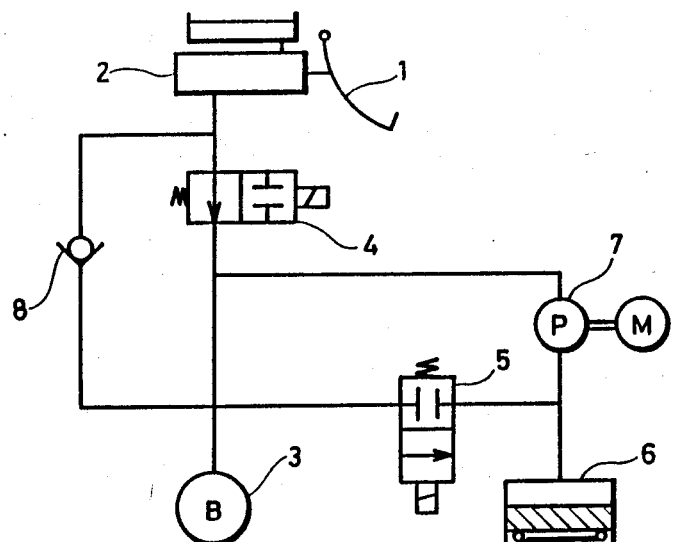
FIG. 1 is a hydraulic circuit diagram showing an antilocking apparatus for a vehicle, which solves the problem of kick-back against a brake pedal.
Figure 7:
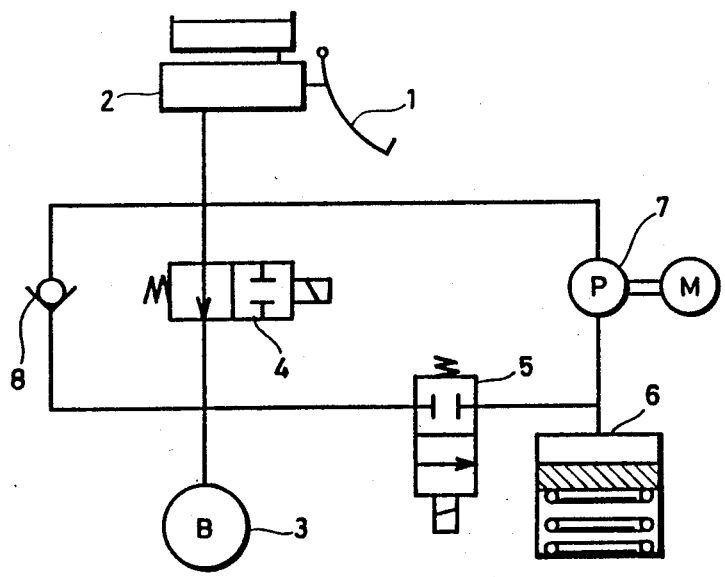
FIG. 7 is a hydraulic circuit diagram showing a well-known reflux type antilocking apparatus.
Figure 8:
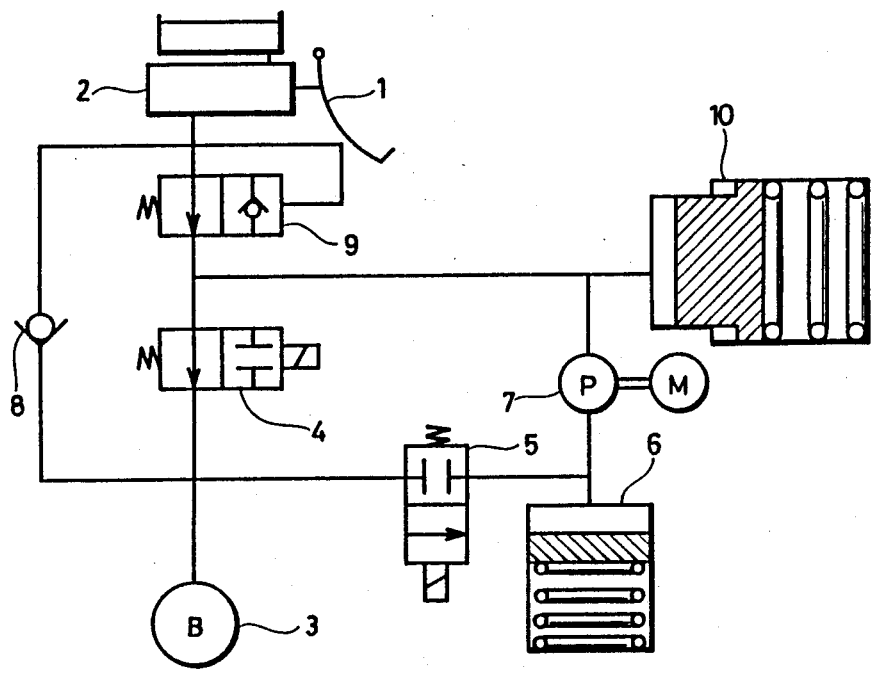
FIG. 8 is a hydraulic circuit diagram of an antilocking apparatus disclosed in U.S. Pat. No. 4,453,782.

FIG. 1 is a sectional view showing an antilocking apparatus, which comprises an inlet valve 4 provided in a fluid path between a master cylinder 2 and a wheel brake 3, an outlet valve 5 which can discharge working fluid from a fluid path portion connecting the inlet valve 4 with the wheel brake 3, a damping reservoir 6 for temporarily storing the working fluid discharged through the outlet valve 6 and a pump 7 for drawing the working fluid stored in the damping reservoir 6, similarly to the conventional apparatus shown in FIG. 7. While the working fluid discharged by the pump 7 is introduced into the fluid path portion between the master cylinder 2 and the inlet valve 4 in the conventional apparatus shown in FIG. 7, the working fluid discharged from the pump 7 of the apparatus shown in FIG. 1 is introduced into a fluid path portion connecting the inlet valve 4 with the wheel brake 3.

The inlet valve 4 shown in FIG. 1 is constructed as an electrically switch-controlled two-port, two-position directional control valve. In a non-energized state shown in FIG. 1, the inlet valve 4 is in a first valve position to allow a fluid flow through the valve 4. Upon energization, the inlet valve 4 is switched to a second valve position, to cut off the fluid flow through the valve 4.

The outlet valve 5 shown in FIG. 1 is also constructed as an electrically switch-controlled two-port, two-position directional control valve. In the non-energized state shown in FIG. 1, the outlet valve 5 is in a first valve position to cut off a fluid flow through the valve 5. Upon energization, the outlet valve 5 is switched to a second valve position to allow the fluid flow through the valve 5.

Dissimilarly to the conventional apparatus shown in FIG. 7, the working fluid discharged from the pump 7 is introduced into the fluid path portion between the inlet valve 4 and the wheel brake 3 in the apparatus shown in FIG. 1, whereby the working fluid can be prevented from flowing back to the master cylinder 2. Thus, no kick-back is caused against the brake pedal 1.

The conventional apparatus shown in FIG. 7 can be switched to three modes, i.e., step-up, holding and step-down modes, with respect to the wheel brake 3, by appropriate control of the inlet valve 4 and the outlet valve 5. More specifically, the apparatus enters the step-up mode when both the inlet valve 4 and the outlet valve 5 are brought into non-energized states, while the apparatus is switched to the step-down mode when both the inlet valve 4 and the outlet valve 5 are energized. When the inlet valve 4 is energized and the outlet valve 5 is not energized, the apparatus assumes the holding mode.

In the apparatus shown in FIG. 1, on the other hand, both the inlet valve 4 and the outlet valve 5 are energized upon initiation of an antilocking operation. In such a state, the inlet valve 4 cuts off the fluid flow, while the outlet valve 5 allows the fluid flow. Thereafter control is performed only through the operation of the outlet valve 5, so that the apparatus is switched between step-up and step-down modes. Namely, the apparatus enters the step-up mode when the outlet valve 5 is brought into the non-energized state as shown in FIG. 1, while the apparatus is switched to the step-down mode when the outlet valve 5 is energized. In this case, the step-up speed is determined by the discharge ability of the pump 7.

Slow re-pressurization to a wheel brake is a requisite in one aspect of an antilocking control. The well-known three-mode type apparatus achieves such a slow re-pressurization by appropriately changing the step-up mode into the holding mode.

In the two-mode type apparatus shown in FIG. 1, on the other hand, time allocations for the step-up mode and the step-down mode are appropriately selected, thereby to achieve a slow re-pressurization of the wheel brake. Assuming that Vave represents an average step-up or step-down speed, Vi represents a step-up speed, Vd represents a step-down speed, Ti represents a step-up time and Td represents a step-down time, the following relation is obtained:

$$Vave = (Vi \times Ti + Vd \times Td)/(Ti + Td).$$

Namely, it is necessary to properly select the discharge ability of the pump 7 in response to rigidity of the brake system in the apparatus shown in FIG. 1. In the well-known apparatus, on the other hand, the discharge ability of the pump 5 may only be larger than a constant limit. In the apparatus shown in FIG. 7, however, a kick-back against the brake pedal 1 is increased with an increase in the discharge ability of the pump 7.

Incidentally, the friction coefficient of a road surface may such during an antilocking control that a higher brake fluid pressure is preferably applied. In such a case, the brake pressure is continuously increased without limitation by continuously increasing the time allocation for an opening state of the inlet valve 4 in the conventional apparatus which introduces the working fluid discharged from the pump 7 into an upstream side of the inlet valve 4, provided a pedal force to the pedal is sufficiently high.

In the apparatus shown in FIG. 1, however, the inlet valve 4 must be brought into an open state, i.e., a non-energized state if the required brake pressure is larger than that upon initiation of an antilocking control. In the apparatus shown in FIG. 1, therefore, the inlet valve 4 remains in a closed state in a locking tendency when decisions regarding dumping of the brake pressure are being made, i.e., whether the opening state of the outlet valve 5 is generated at appropriate intervals. If a subsequent locking tendency is delayed over a constant limit, the inlet valve 4 is opened for an appropriate period, with an appropriate continuation time and interval, similarly to the well-known apparatus.

Thus, when the apparatus shown in FIG. 1 is employed, slight modifications are required in the control system and construction of the pump discharge ability. Such modifications are not particularly difficult and can be realized as required. In the apparatus shown in FIG. 1, however, the inlet valve 4 is different in function from that of the well-known apparatus. If the inlet valve 4 comprises an electromagnetic valve, a complicated electronic circuit will be required. If such an electronic circuit is employed, the cost is increased as a matter of course, while the operational reliability may be reduced.

According to the present invention, therefore, the inlet valve 4 comprises a differential pressure responsive valve, which is lower in cost and for a higher operational reliability than an electromagnetic valve.

Figure 2:
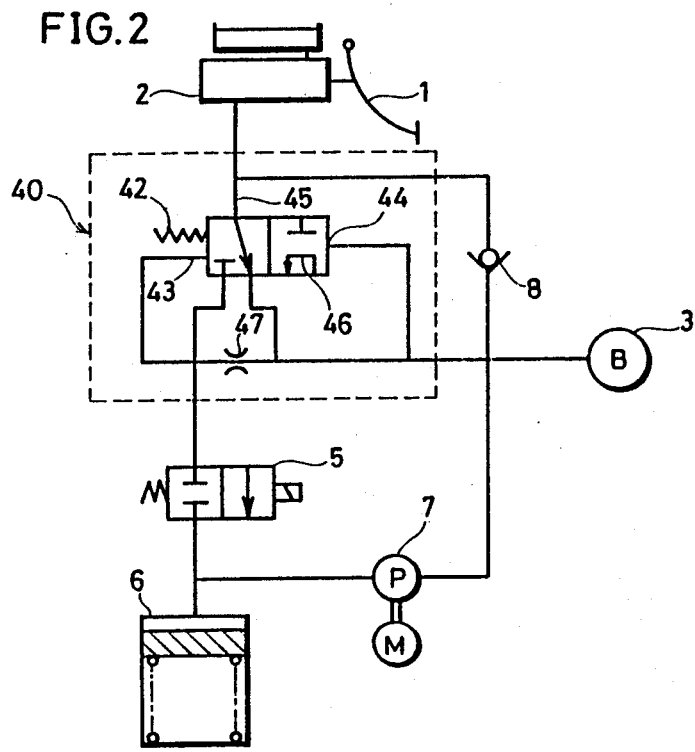
FIG. 2 is a hydraulic circuit diagram showing an embodiment of the present invention.
Figure 3:
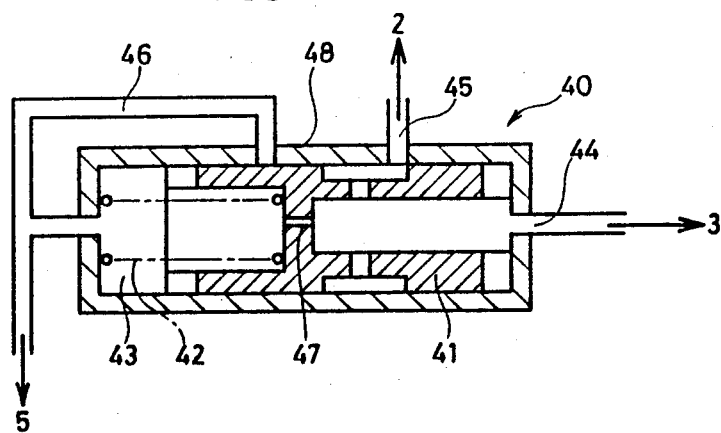
FIG. 3 is a sectional view schematically illustrating structural features of a differential pressure responsive valve shown in FIG. 2 and showing a first operational state.

FIG. 2 is a hydraulic circuit diagram showing an embodiment of the present invention. While the inlet valve 4 comprises an electromagnetic valve in the apparatus shown in FIG. 1, an inlet valve 40 of embodiment of FIG. 2 comprises a differential pressure responsive valve, which is actuated by differential pressure between the fluid pressure in a fluid path portion connecting the inlet valve 40 with a wheel brake 3 and the fluid pressure in a fluid path portion connecting the inlet valve 40 with an outlet valve 5. FIG. 3 illustrates the actual construction of such a differential pressure responsive valve 40.

The differential pressure responsive valve 40 comprises a casing 48, a spool 41 which is slidable along the inner surface of the casing 48. The spool 41 has a first end facing a fluid path portion communicating with the wheel brake 3 and a second end facing a fluid path portion communicating with the outlet valve 5. A spring 42 biases the spool 41 with its first end toward the right. The spool 41 is provided with an orifice 47 which connects the fluid path portion communicating with the wheel brake 3 with the fluid path portion communicating with the outlet valve 5.

The casing 48 has a plurality of ports. Configurations of the casing 48 and the spool 41 and the positional relationship therebetween are so selected as to implement three operating states. FIG. 3 shows a first operating state and FIG. 4 shows a second operating state, while FIG. 5 shows a third operating state.

In the first operating state shown in FIG. 3, a master cylinder 2 communicates with the wheel brake 3 through a large passage including a chamber 44 and a passage 45. The master cylinder 2 further communicates with the outlet valve 5 through the orifice 47. The wheel brake 3 communicates with the outlet valve 5 through the orifice 47.

Figure 4:
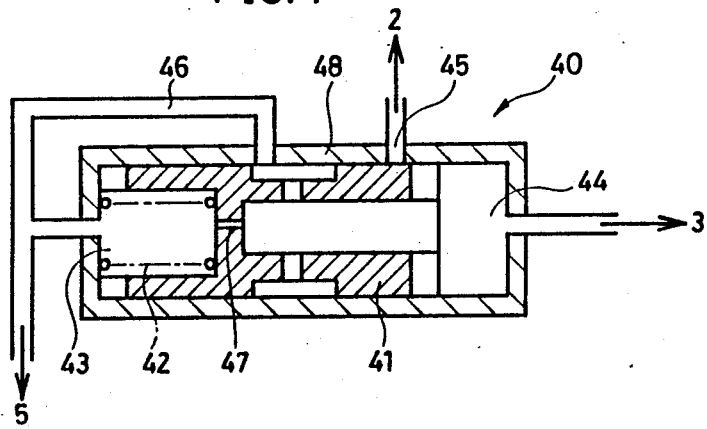
FIG. 4 is a sectional view schematically showing a leftward movement of a spool from the state shown in FIG. 3 and representing a second operational state.

In the second operating state shown in FIG. 4, communication between the master cylinder 2 and the wheel brake 3 is cut off. Communication between the master cylinder 2 and the outlet valve 5 is also cut off. The wheel brake 3 communicates with the outlet valve 5 through the large passage including the chamber 44.

Figure 5:
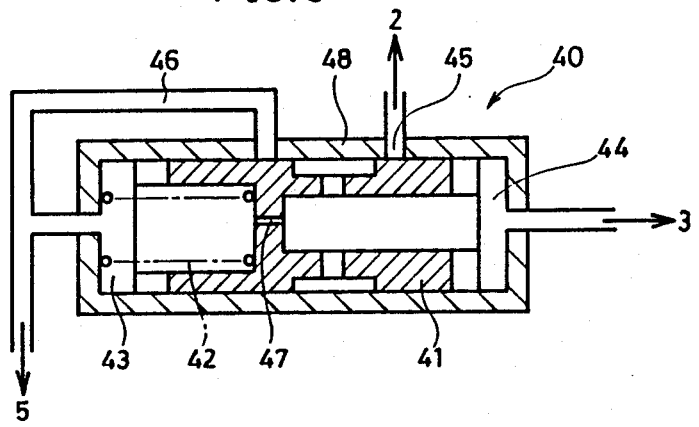
FIG. 5 is a sectional view showing a slight rightward movement of the spool from the state shown in FIG. 4 to illustrate a third operational state.

In the third operating state shown in FIG. 5, communication between the master cylinder 2 and the wheel brake 3 is cut off. Communication between the master cylinder 2 and the outlet valve 5 is also cut off. The wheel brake 3 communicates with the outlet valve 5 through the orifice 47.

Normally the spool 41 is urged by the spring 42, having a relatively weak urging force, into the first operating state as shown in FIG. 3. In this state, the master cylinder 2 communicates with the wheel brake 3 through the passage 45 and the chamber 44.

When the outlet valve 5 is energized to open its passage upon initiation of an antilocking operation, pressure in a chamber 43, positioned on the left side of the spool 41 in FIG. 3, is reduced. Pressure in the fluid path portion communicating with the wheel brake 3 acts in the further chamber 44 positioned on the right side of the spool 41 in FIG. 3. When pressure in the chamber 43 is thus reduced, the spool 41 is moved to the left in FIG. 3 against the biasing force of the spring 42. Therefore, communication between the passage 45 to the master cylinder 2 and the chamber 44 communicating with the wheel brake 3 is cut off. This is the third operating state shown in FIG. 5.

When an opening state of the outlet valve 5 is sustained, the spool 41 is moved further to the left from the state shown in FIG. 5, whereby the chamber 44 communicates with the chamber 43 through a bypass 46. This is the second operating state shown in FIG. 4. Since the flow rate in the opening state of the outlet valve 5 is set to be larger than the discharge of the pump 7, pressure applied to the wheel brake 3 is continuously lowered even if the pump 7 is in a discharging state, so far as the outlet valve 5 is open.

When the outlet valve 5 is de-energized to be closed in the step-up mode, pressure applied to the wheel brake 3 is increased in proportion to the discharge from the pump 7. Since the chamber 44 communicates with the chamber 43 through the orifice 47 which is provided in the spool 41, the spool 41 is urged by the spring 42 to return sequentially to the right into its original position, from the state shown in FIG. 4. With such movement of the spool 41, a fluid flow is caused to pass through the orifice 47. The differential pressure between the chambers 44 and 43 is defined by the spring 42. The return speed of the spool 41 is determined by the rate of the flow caused by the differential pressure to pass through the orifice 47.

Thus, the return time of the spool 41 is determined by the distance between closure of the bypass 46 and opening of the passage 45 communicating with the master cylinder 2 and the aforementioned return speed. After a lapse of this return time following a final closure of the outlet valve 5, the master cylinder 2 again communicates with the wheel brake 3. The above return time is chosen to obtain a desired balance between a smooth control and a quick response to a change in a friction coefficient of the road surface.

The aforementioned return time is important also with regard to safety when the outlet valve 5 is opened, in response to a failure of the pump 7. If the pump 7 is not actuated after pressure to the wheel brake 3 has been reduced by opening of the outlet valve 5, pressure on the brakes becomes lower than optimal pressure which is responsive to the current state of the road surface. Therefore, any deceleration is slower than a possible maximum deceleration permitted by the road surface, although a locking state is avoided. When the prescribed return time elapses in this state, the master cylinder 2 is automatically coupled with the wheel brake 3 again, whereby the brake force is again increased. The movement of the spool 41 is independent of any change in master cylinder pressure. Therefore, a check valve 8 is required in order to reduce the brake pressure in response to the master cylinder pressure in an interval shorter than the aforementioned return time when the brake pedal 1 is abruptly loosened after opening of the outlet valve 5.

Figure 6:
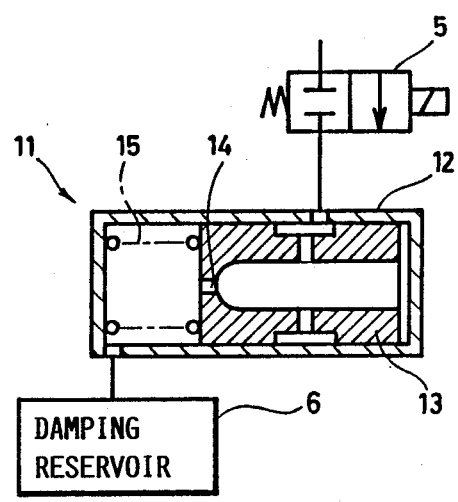
FIG. 6 is a sectional view schematically showing a flow regulating valve which is added to an outlet valve.

In another embodiment of the present invention, a flow regulating valve 11 can be added to an outlet valve 5, as shown in FIG. 6. The flow regulating valve 11 comprises a casing 12, a spool 13 which is slidable along the inner surface of the casing 12 and a spring 15 for unidirectionally urging or biasing the spool 13. The spool 13 is provided with an orifice 14. When the outlet valve 5 is opened in the state shown in FIG. 6, differential pressure is caused across the orifice 14. Thus, the spool 13 is moved to the left in FIG. 6 against the biasing force of the spring 15. The spool 13 is held in a constant position when the biasing force of the spring 15 is balanced with the differential pressure across the orifice 14. Namely, fluid passing through the outlet valve 5 is allowed to pass through the flow regulating valve 11 only at a constant rate which is determined by the differential pressure across the orifice 14. Thus, the flow regulating valve 11 is adapted to discharge the fluid at a constant discharge speed when the outlet valve 5 is open, without any regard to the level of brake pressure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An antilocking apparatus for performing an antilocking operation for a wheel brake of a vehicle, said antilocking apparatus comprising a master cylinder; an inlet valve provided in a fluid path connecting said master cylinder with said wheel brake for selectively allowing and cutting off communication between said master cylinder and said wheel brake through said fluid path; an electrically switch-controlled outlet valve capable of discharging a working fluid from a fluid path portion connecting said inlet valve with said wheel brake; a damping reservoir for temporarily storing said working fluid discharged through said outlet valve; a pump for drawing said working fluid stored in said damping reservoir and delivering said working fluid into said fluid path portion connecting said inlet valve with said wheel brake, said inlet valve comprising differential pressure responsive valve means actuated by a differential pressure between fluid pressure in said fluid path portion connecting said inlet valve with said wheel brake and fluid pressure in a fluid path portion connecting said inlet valve with said outlet valve, said differential pressure responsive valve means comprising a casing, a spool slidable along an inner surface of said casing, said spool having a first end facing a fluid path portion communicating with said wheel brake and a second end facing a fluid path portion communicating with said outlet valve, and a spring for normally urging said spool toward said first end, said spool having an orifice connecting said fluid path portion communicating with said wheel brake and said fluid path portion communicating with said outlet valve, said casing having a plurality of ports and a casing configuration for cooperation with said spool, said spool having fluid passages and a spool configuration located for cooperation with respective ones of said ports and configuration in said casing depending on a first, a second, and a third relative position between said casing and said spool for implementing three respective operational states, including a first operational state allowing communication between said master cylinder and said wheel brake through a large passage of said passages in said spool, communication between said master cylinder and said outlet valve through said orifice, and communication between said wheel brake and said outlet valve through said orifice; a second operational state cutting off communication between said master cylinder and said wheel brake and between said master cylinder and said outlet valve, and allowing communication between said wheel brake and said outlet valve through a large passage of said passages in said spool; and a third operational state cutting off communication between said master cylinder and said wheel brake and between said master cylinder and said outlet valve, and allowing communication between said wheel brake and said outlet valve through said orifice.

2. The antilocking apparatus of claim 1, wherein said valve casing and said valve spool of said differential pressure responsive valve means cooperate with each other for cutting off communication between said master cylinder and said wheel brake through said fluid path in respoonse to an initiation of an operation for opening said outlet valve, and wherein a spacing between two of said ports (45, 46) and the flow cross-sectional area of said orifice are so dimensioned that communication between said master cylinder and said wheel brake is again established through said fluid path after a lapse of a constant time from closing said outlet valve.

3. The antilocking apparatus of claim 1, wherein said outlet valve includes a flow regulating valve for allowing passage of said working fluid through said outlet valve at a constant flow rate.

* * * * *